(12) United States Patent
Hector et al.

(10) Patent No.: US 6,750,925 B2
(45) Date of Patent: Jun. 15, 2004

(54) ACTIVE MATRIX DISPLAY DEVICE

(75) Inventors: Jason R. Hector, Redhill (GB); John R. Hughes, Horley (GB); Martin J. Edwards, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 104 days.

(21) Appl. No.: 10/247,922

(22) Filed: Sep. 20, 2002

(65) Prior Publication Data
US 2003/0076451 A1 Apr. 24, 2003

(30) Foreign Application Priority Data

Oct. 18, 2001 (GB) ............................................. 0125019

(51) Int. Cl.[7] ........................................... G02F 1/1343
(52) U.S. Cl. ......................................... 349/39; 349/139
(58) Field of Search ........................... 349/38, 39, 139; 345/87–100

(56) References Cited

U.S. PATENT DOCUMENTS 5,130,829 A  7/1992 Shannon ..................... 359/59

OTHER PUBLICATIONS

Abstracts of Japan, "Production of Substrate for Display Device", Publication No. 06148661, Publication Date May 27, 1994, by Mitamura Sadao.
Paper "Manufacturing of Large Wide–View Angle Seamless Tiled AMLCDs for Business and Cconsumer Applications", by R. Greene et al, IDMC 2000, pp. 191–194.

*Primary Examiner*—Robert H. Kim
*Assistant Examiner*—Richard H Kim

(57) ABSTRACT

An active matrix display device comprises an array of picture elements, e.g. liquid crystal picture elements, first and second sets of address conductors (16, 18) extending in row and column directions respectively and connected with the picture elements, and a set of connection conductors (30) extending in the same direction as the second set of address conductors (18), each of which is connected to a respective one of the first set of conductors (16) at the location of a picture element, and via which address signals are supplied to that first set. Picture elements other than those at the locations of the connections between the connection conductors and first set of address conductors are provided with a capacitance between their picture element electrode and their associated address conductor of the first set in order to compensate for the effects of a parasitic capacitance present between the picture element electrodes and the connection conductors which can lead to anomalies in the display outputs of the picture elements following their addressing.

6 Claims, 4 Drawing Sheets

ACTIVE MATRIX DISPLAY DEVICE

The present invention relates to active matrix display devices and more particularly to an active matrix display device having an array of picture elements which each comprise a picture element electrode and an associated switching device and which are located at the intersections between crossing first and second sets of address conductors connected to the picture elements and via which selection and data signals respectively are supplied to the picture elements, and which includes a set of connection conductors through which selection signals are provided to the first set of address conductors, and each of which connection conductors extends in the direction of, and between, a respective adjacent pair of address conductors of the second set and is electrically connected to a respective address conductor of the first set at the location of a respective picture element.

An active matrix liquid crystal display device (AMLCD) of this kind, and suitable for use in, for example, portable applications such as mobile telephones, camera viewfinders, electronic personal organisers and the like, is described in European Patent Application No. 01200466.9 (PHNL 010074).

The provision of the set of connection conductors enables addressing signals for driving the picture elements, comprising selection (scanning) signals applied to the row address conductors and display data signals applied to the column address conductors, to be supplied at either a common side of the support or at opposing, parallel, sides of the support rather than at two mutually perpendicular sides as in conventional AMLCDs and the like. In a conventional AMLCD a set of row address conductors, carrying the selection signals, and a set of column address conductors, carrying the data signals, each extend over a rectangular support beyond the area of the array of picture elements electrodes to respective peripheral regions of the support on which they are carried, and comprising two adjacent, edge parts of the support, for the purpose of enabling electrical contact to be made with the sets of address conductors. For example, row and column drive circuit ICs may be directly mounted on these peripheral border regions of the support with their output terminals connected to the extended address conductors or, alternatively, may be mounted on foil with their output terminals connected to the address conductors via tracks on the foil. The set of connection conductors allows the ICs to be provided instead either at a common peripheral border region along just the side of the support or at respective peripheral border regions along opposing, parallel, sides of the support, or alternatively for foil connections to be made at such parts.

As described in the aforementioned application, this feature can be used, for example, to enable the effective display area for a given size of support to be increased in one dimension, which is of benefit when the display device is used in small portable products. A similar kind of connection scheme is described in the paper by R. Greene et al entitled "Manufacturing of Large Wide-View Angle Seamless Tiled AMLCDs for Business and Consumer Applications", IDMC 2000, pages 191–194. The benefit in this case is that facilitate tiling of individual display panels is facilitated by allowing the address conductors to be driven from just one edge.

It has been found, however, that the operational characteristics of such display devices can be affected adversely by the presence of the connection conductors. In particular, it has been found that the display device can suffer picture element non-uniformity and image retention problems.

It is an object of the present invention to provide an improved display device of the kind described in the opening paragraph.

It is a further objection of the present invention to provide a display device in which the aforementioned problems are alleviated at least to some extent.

According to the present invention, there is provided an active matrix display device of the kind described in the opening paragraph wherein in each picture element a parasitic capacitance exists between the picture element electrode and a connection conductor, and wherein picture elements other than those at the locations of the connections between the connection conductors and the address conductors of the first set are each provided with a supplementary capacitance between their picture element electrodes and their associated address conductors of the first set.

The supplementary capacitances lead to improved display quality with unwanted display artefacts being reduced significantly. The invention stems from a recognition that certain parasitic capacitance effects are introduced by the presence of the connection conductors which are responsible for the aforementioned problems. The nature of the parasitic capacitances means that those picture elements which are situated at the locations of the connections between the connection conductors and their associated address conductors of the first set, and which are coupled to the address conductors connected at those points to the connection conductors, experience different consequences to picture elements elsewhere in the array. As a result then so-called kickback effects for picture elements at the connection point locations are unlike those for other picture elements and for a similar given applied data signal voltage, therefore, their display outputs will be different to display outputs from the other picture elements. Moreover, these picture elements can be affected by a consequential rms DC voltage producing ageing effects in the LC material and an image retention problem. By adding a capacitance of suitably selected value to the other picture elements then the kickback effects for all picture elements can be made similar, thereby improving picture element uniformity. The value of the supplementary capacitance may be approximately equal to the parasitic capacitance between the picture element electrode and a connection conductor.

Typically in active matrix display devices such as AMLCDs, the picture elements inevitably have a parasitic capacitance present between their picture element electrode and their associated address conductor carrying the selection signals, the value of which capacitance can vary according to the exact nature of its structure. The added capacitance will be additional to this particular parasitic capacitance. Such a parasitic capacitance can result from an edge of the picture element electrode extending alongside, or perhaps slightly overlapping, a portion of the address conductor and separated therefrom by dielectric material. The added capacitance may be provided by altering these contributory parts in picture elements other than those at the locations of the connection points in order to increase the parasitic capacitance. This could, for example, be achieved by locally thinning intervening dielectric material in the case of overlying picture element electrodes and address conductor portions. Preferably, however, it is achieved conveniently by providing or increasing an area of overlap between the electrode and the address conductor, either by designing a part of the electrode to extend over the address conductor to a greater extent or vice versa. Alternatively, the added capacitance may be provided in the form of a separate capacitor structure connected between the picture element electrode and the address conductor.

The connection conductors may extend as lines beneath the picture element electrodes, and be separated therefrom by an intervening layer of dielectric material. Alternatively, these lines may be arranged to extend laterally adjacent the picture element electrodes, for example alongside the address conductors of the second set. This would reduce the capacitance between these conductors and the picture element electrodes which is an important factor as the value of the capacitance added to picture elements needed would then be much smaller. This can be beneficial also in the case of the display device being a transmissive type with the picture element electrodes comprising a transparent conductive material, such as ITO, as otherwise the lines would similarly need to be of transparent material when placed underneath the picture element electrodes. However, positioning these lines laterally adjacent the picture element electrodes could result in a decrease in picture element aperture.

Although applicable particularly to active matrix liquid crystal displays devices, the invention may advantageously be applied also to different kinds of active matrix display devices using other electro-optic materials for the picture elements, such as electrophoretic, and electrochromic display devices.

Embodiments of active matrix display devices in accordance with the invention, and in particular liquid crystal display devices, will now be described, by way of example, with reference to the accompanying drawings, in which.

It should be understood that the Figures are merely schematic and are not drawn to scale. The same reference numbers are used throughout the Figures to denote the same or similar parts.

Figure 1:
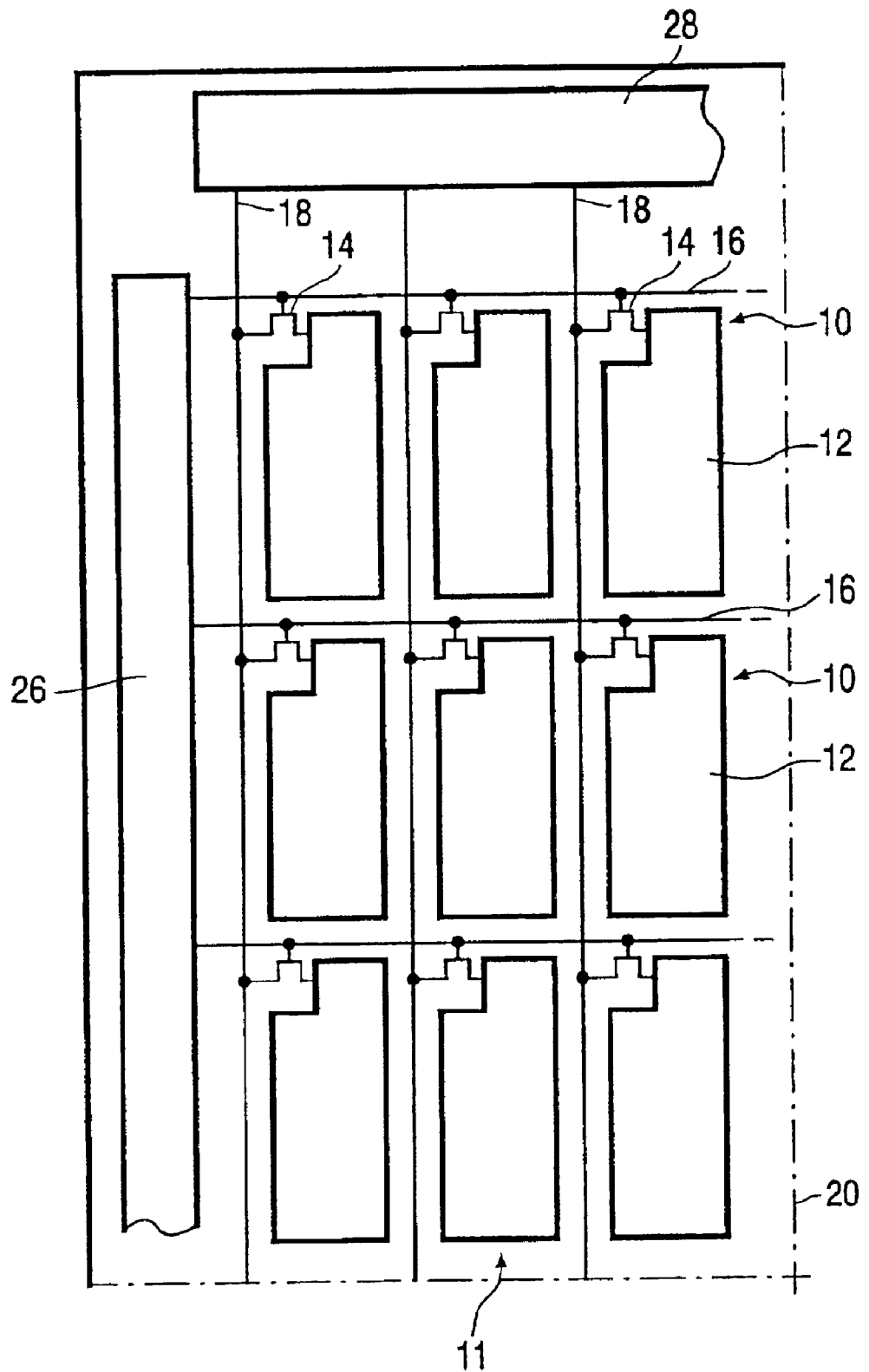
FIG. 1 illustrates schematically the arrangement of a typical group of adjacent picture elements in a conventional AMLCD configuration.

Referring to FIG. 1, there is shown part of a conventional form of active matrix liquid crystal display device having a matrix array 11 of individually-addressable picture elements 10, each comprising a discrete picture element electrode 12 and an associated switching device in the form of a thin film transistor, TFT, 14, which may be of amorphous silicon (a-Si) or polysilicon type. The general construction and operation of such a device is described, for example, in U.S. Pat. No. 5,130,829 to which reference is invited and whose disclosure in these respects is incorporated herein. Briefly, the picture element electrodes 14 are organised in rows and columns and first and second, mutually-perpendicular, sets of address conductors, namely row, selection, address conductors 16 and column, data, address conductors 18, extend between the picture element electrodes 12 with each electrode being located adjacent the intersection of a respective pair of row and column address conductors. The picture element electrodes, sets of address conductors and TFTs are all carried on a support 20, for example a glass plate. A second support, for example again a glass plate, (not shown) is arranged overlying, and parallel to, the support 20 and carries a common electrode. The two supports are spaced from one another and liquid crystal material is disposed between the supports, the liquid crystal material being contained by a seal extending around the periphery of the array between the supports. Each picture element electrode together with an overlying portion of the common electrode and the liquid crystal material therebetween defines a respective display element.

To drive the picture elements, row and column drive circuits 26 and 28 are connected to the sets of row and column address conductors 16 and 18 respectively at their one ends. The row drive circuit 26 provides selection (scanning) signals to each of the row address conductors 16 in sequence to turn on each row of TFTs 14 in turn, and the column drive circuit 28 provides data (video) voltage signals, obtained for example by sampling an input video signal, to each of the column address conductors 18 in synchronism with row selection. The drive circuits 26 and 28 normally are provided in the form of ICs which may be mounted on regions of the support 20 between two, adjacent, sides of the array and respective edges of the support, as depicted in FIG. 1, or alternatively mounted on foil or tape when using COF (Chip on Foil) or TCP (Tape Carrier Package) techniques with the foil or tape then being interconnected with the sets of address conductors at peripheral regions along two adjacent sides of the support. In the case of a polysilicon AMLCD, the drive circuits may instead be actually fabricated on the peripheral region of the support 20 using the same processes, and, at the same time, as the active matrix circuitry comprising the TFTs and address conductors, etc, so as to be fully integrated on the support.

Figure 2:
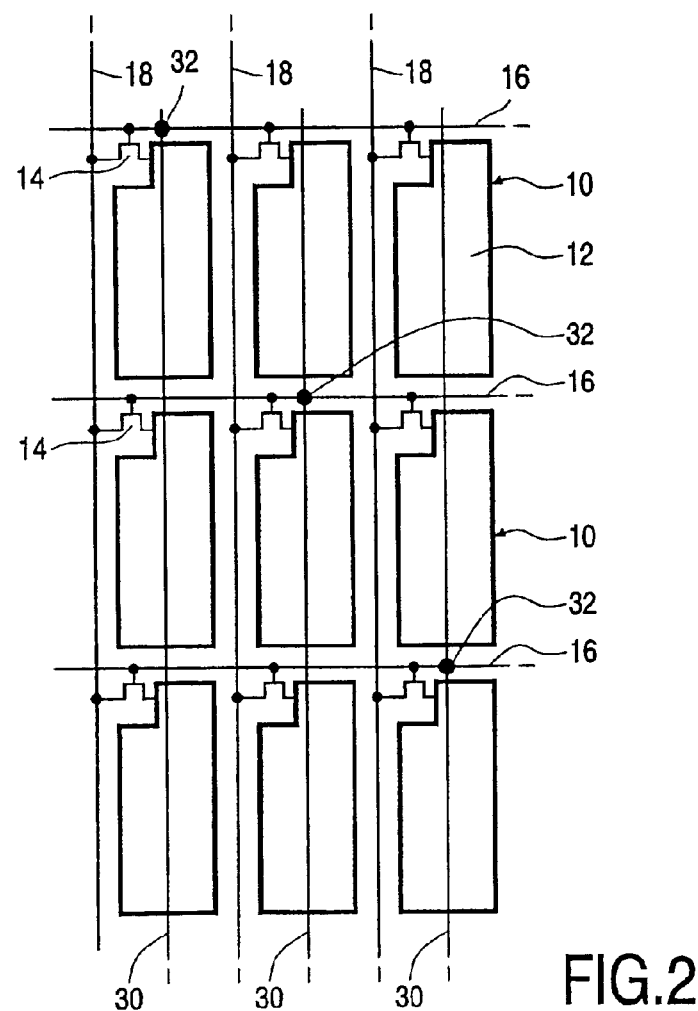
FIG. 2 illustrates schematically the arrangement of a typical group of picture elements in an alternative AMLCD configuration.

As will be appreciated, the need to dedicate peripheral portions of the support along two adjacent sides for the mounting of ICs or provision for interconnections with tapes or foils can be limiting as the overall size of the support 20 both in height and width needs to be significantly larger than the array to accommodate such. An alternative arrangement has been proposed which offers advantages in this respect. FIG. 2 shows part of a picture element array using the principles of this alternative arrangement. The array similarly has picture element electrodes 12 and associated TFTs 14 connected to sets of row and column address conductors 16 and 18. In this arrangement, however, the row address conductors 16 terminate immediately adjacent opposed edges of the picture element array and a set of connection conductors 30, in the form of supplementary column conductor lines extending parallel to the column address conductors 18, are provided, each of which extends from one side of the array to the opposite side along a respective column of picture element electrodes 12. Each conductor 30 is connected to a respective and different one of the row address conductors 16 at a connection point 32 which is situated at a position corresponding to the location of a respective picture element. The position of this connection point along the length of the conductor 30 corresponds to the cross-over between the conductor and its associated address conductor 16 and differs for each conductor.

Figure 3:
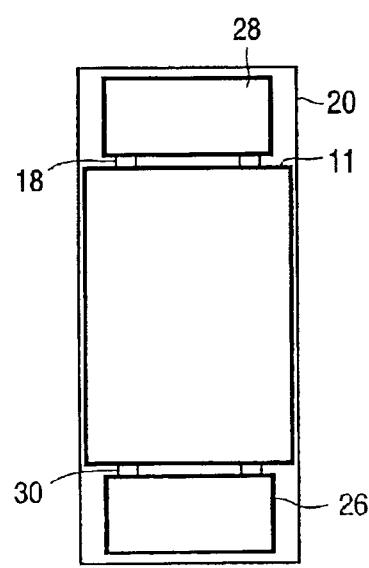
FIG. 3 shows schematically a possible arrangement of drive circuits in the type of AMLCD shown in FIG. 2.

The connection conductors 30 enable the row selection signals to be applied to the row address conductors 16 from a side of the array corresponding to, or opposite to, the side at which the data signals are applied to the column address conductors 18, for example as shown in the schematic, plan, view of the display device in FIG. 3 with row and column drive circuit ICs 26 and 28 in this case being carried at respective edge parts of the support 20 on opposing sides of the picture element array 11 and the ends of the column address conductors 18 and the lines 30 being connected respectively to the column and row drive circuits ICs. As a consequence, there is no need to devote a peripheral edge region of the support 20 along a side adjacent the ends of the set of row address conductors 16 for the row drive circuit IC or interconnections thereto. This means that a reduction in the area of the support for a given display size is possible, resulting in a greater number of active plates for display devices being obtained from, for example, a single processed, initially large area, glass sheet. Also, the symmetrical nature of the display device, with minimal excess area at opposing sides, is beneficial in many applications, particularly for small area display devices as used in mobile phones and the like.

Examples of display devices of this kind and further advantages obtained by using such an arrangement, are described in European Patent Application No 0 1200 466.9 to which reference is invited and whose contents are incorporated herein. The row and column address conductors may be contacted from the same side of the array and the connection conductors may extend adjacent the column address conductors in the space between adjacent columns of picture element electrodes, as in the arrangement in the aforementioned paper by R. G. Greene et al.

In the FIG. 2 example, the conductors 30 each extend beneath, and approximately centrally of, a respective column of picture element electrodes 12. In the case of the display device being a reflective display using a reflective metal for the electrodes 12, the lines may be formed from a metal, such as aluminium, and possibly from the same deposited metal layer as used for the column address conductors 18. In the case of a transmissive display in which the electrodes 12 comprise a transparent conductive material such as ITO, the lines 30 are preferably similarly formed of transparent conductive material.

Figure 4:
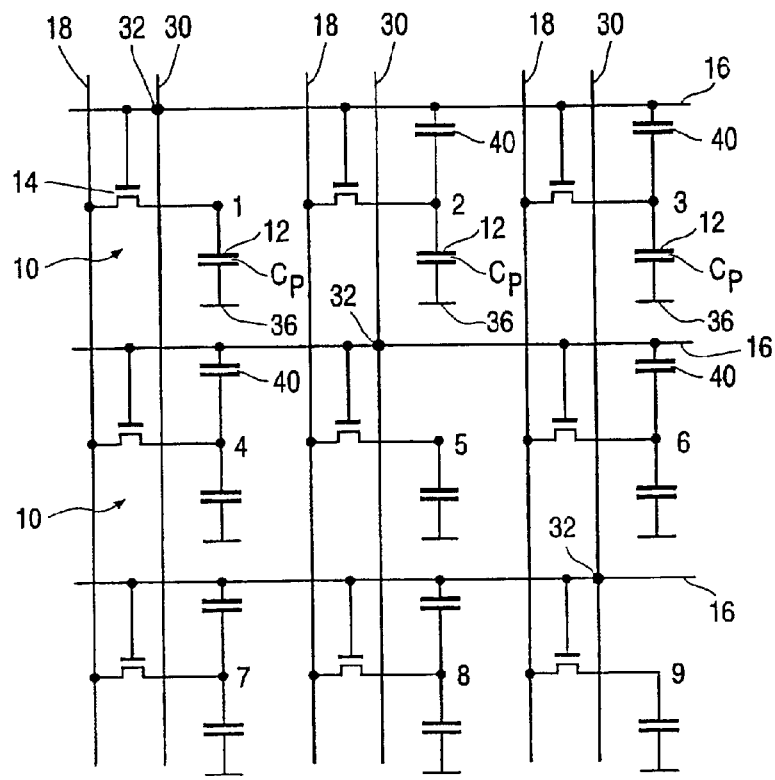
FIG. 4 shows the equivalent electrical circuit for a group of picture elements in an embodiment of AMLCD according to the present invention.

An embodiment of display device according to the invention, and comprising a device similar to that of FIG. 2 but with modifications, will now be described with reference to FIG. 4 which shows the equivalent electrical circuit of a typical group of picture elements 10 (labelled 1 to 9) in the display device. The picture element electrode 12 in each picture element and the overlying portion of the common electrode, here shown at 36, form a liquid crystal display element having a capacitance Cp to which charge is supplied to provide a desired display output via the TFT 14 upon selection and data signals being applied to the respective row and column address conductors 16 and 18 with which the picture element is associated. In this display device, each picture element 10 in the array other than those situated at the locations of the connection points 32 between the connection conductors 30 and their respective row address conductors 16, i.e the picture elements numbered 1, 5 and 9 in the group shown in FIG. 4, is provided with a supplementary capacitance 40 of predetermined value which is coupled between the picture element's electrode 12 and the row address conductor 16 associated with the picture element.

These additional capacitances 40 serve at least to reduce significantly problems with unwanted display artefacts, and especially picture element display non-uniformities, in the use of display devices of the kind shown in FIG. 2. These artefacts are now understood to be due to differences in parasitic capacitance effects in those picture elements at the connection point locations and the other picture elements which differences lead to different display element voltages being established following their addressing. The purpose of the additional capacitances 40 is to compensate for these differences such that the effects experienced by these other picture elements become similar to those experienced by the picture elements at the connection point locations, thereby ensuring that any differences in the display element voltages produced for similar applied data signal values are minimised. The value of the capacitance 40 is selected appropriately to this end. Their effect in this respect will now be described with reference to FIG. 5 which is similar to FIG. 4 but shows additionally certain parasitic capacitances present in this type of display device.

The presence of the connection conductors 30 introduces parasitic capacitance at each picture element 10, most notably a capacitance $C_1$ between the picture element electrode 12 and the underlying portion of the conductor 30. (A further, less important, parasitic capacitance, not shown, is formed between a conductor 30 and a row address conductor 16 at their cross-over). There typically exists in an AMLCD picture element a parasitic capacitance between its picture element electrode and the picture element's associated row address conductor 16, due to, inter alia, TFT gate/source capacitance and also the fact that the picture element electrode often is arranged close to, and in the case of a reflective AMLCD, overlying the row address conductor at its edge in order to increase the display element's aperture. This parasitic capacitance, which is a fixed value dependent on the picture element structure, is shown at $C_2$ in FIG. 5. The capacitance of the LC picture element itself, shown at Cp, here includes the capacitance of any associated storage capacitor as commonly provided in AMLCDs, usually in parallel with the LC display element and between the picture element electrode 12 and either a row address conductor next to that associated with the picture element or a separate, dedicated, conductor extending parallel to the row address conductor.

Figure 5:
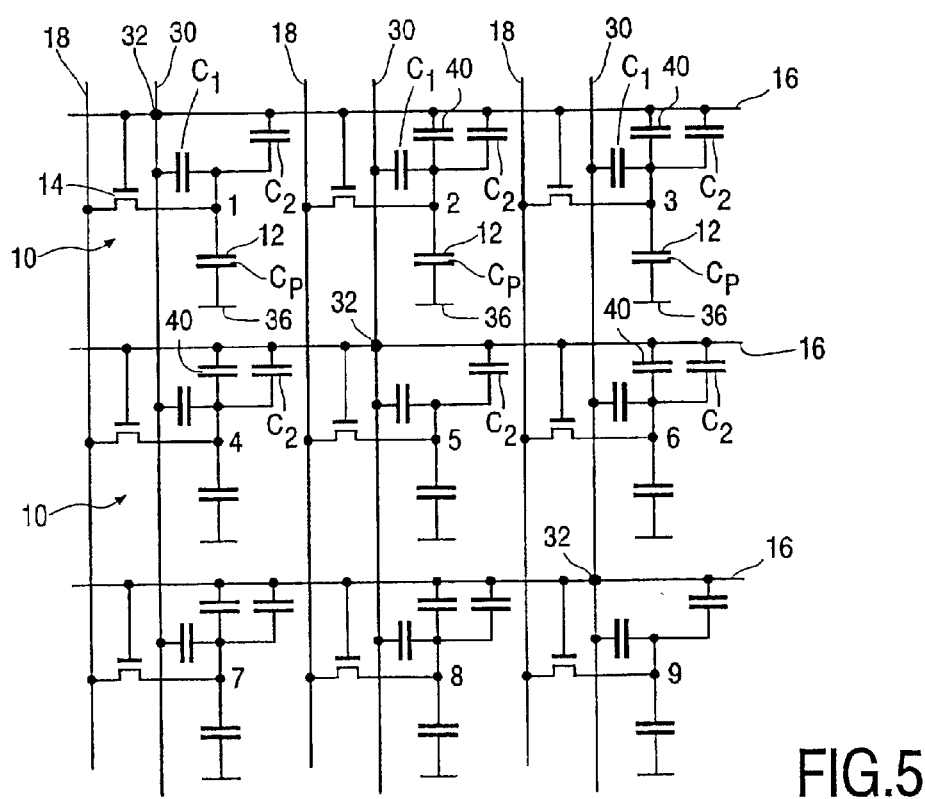
FIG. 5 shows the equivalent electrical circuit including certain parasitic capacitances for a group of picture elements in the device of FIG. 4.

Considering firstly the case in which the supplementary capacitances 40 are not present, as in the device of FIG. 2, then the effect of the capacitance $C_1$ at picture element locations corresponding to the connection points 32, i.e at picture elements 1, 5 and 9 in FIG. 5 connected to the row address conductor 16 in which the connection point in that column occurs, is important as it appears in parallel with the usual parasitic capacitance $C_2$. In all other picture elements it appears in parallel with the storage capacitance. The kickback error voltages resulting from the falling row transition when the selection signal waveform applied to a row address conductor drops from a selection voltage level Von (at which the TFTs are turned on to select the picture elements) to a lower, hold, level Voff (at which the TFTs are held off) are coupled onto the picture element capacitances Cp through $C_2$ but in the case of the picture elements 1, 5 and 9 this kickback error voltage is coupled through both $C_2$ and $C_1$ because the transitions on a row address conductor 16 are present also on the associated connection conductor 30. For these latter picture elements, the kickback voltage, $V_{kb}$ is given by the formula:

$$V_{kb}=[V_{on}-V_{off}]\times(C_1+C_2)/(C_2+Cp) \qquad (1)$$

For all other picture elements, the kickback voltage is given by the formula:

$$V_{kb}=[V_{on}-V_{off}]\times C_2/(C_2+Cp+C_1) \qquad (2)$$

Thus, the kickback for picture elements 1, 5 and 9 and other picture elements at the locations of the connection points is different to that for all other picture elements. With typical drive voltage levels and capacitance values for a display device using a-Si type TFTs, this difference may, for example, be around 1.5V for a small display device. Besides this kickback difference causing anomalies in the outputs of picture elements by virtue of the operation of the picture elements at the connection point locations producing different brightness levels from other picture elements for a given data signal value, the kickback voltage can also appear as an rms DC voltage on all the picture elements which can cause ageing and image retention problem as well.

The effect of the capacitances 40 in the picture elements 12 other for those at the connection point 32 locations is to remove or minimise such differences in kickback levels. The capacitances 40 serve as compensating capacitances which bring the effects of kickback in these picture elements closer, and preferably substantially equal, to the kickback effects experienced by the picture elements at the connection point locations. With the value of the added capacitance being selected to be approximately the same as that of the parasitic capacitance $C_1$, then it will be appreciated from consideration of formulae (1) and (2) that kickback voltage in the picture elements containing them will be brought closer to the kickback voltage in the picture elements at the connection points and with the value of the capacitances suitably chosen, the kickback voltage for all picture elements in the array can be made substantially the same. Consequently, the display output anomalies previously found with picture elements and the connection points, e.g picture elements 1, 5 and 9 in FIG. 4, are at least significantly reduced.

Figure 6:
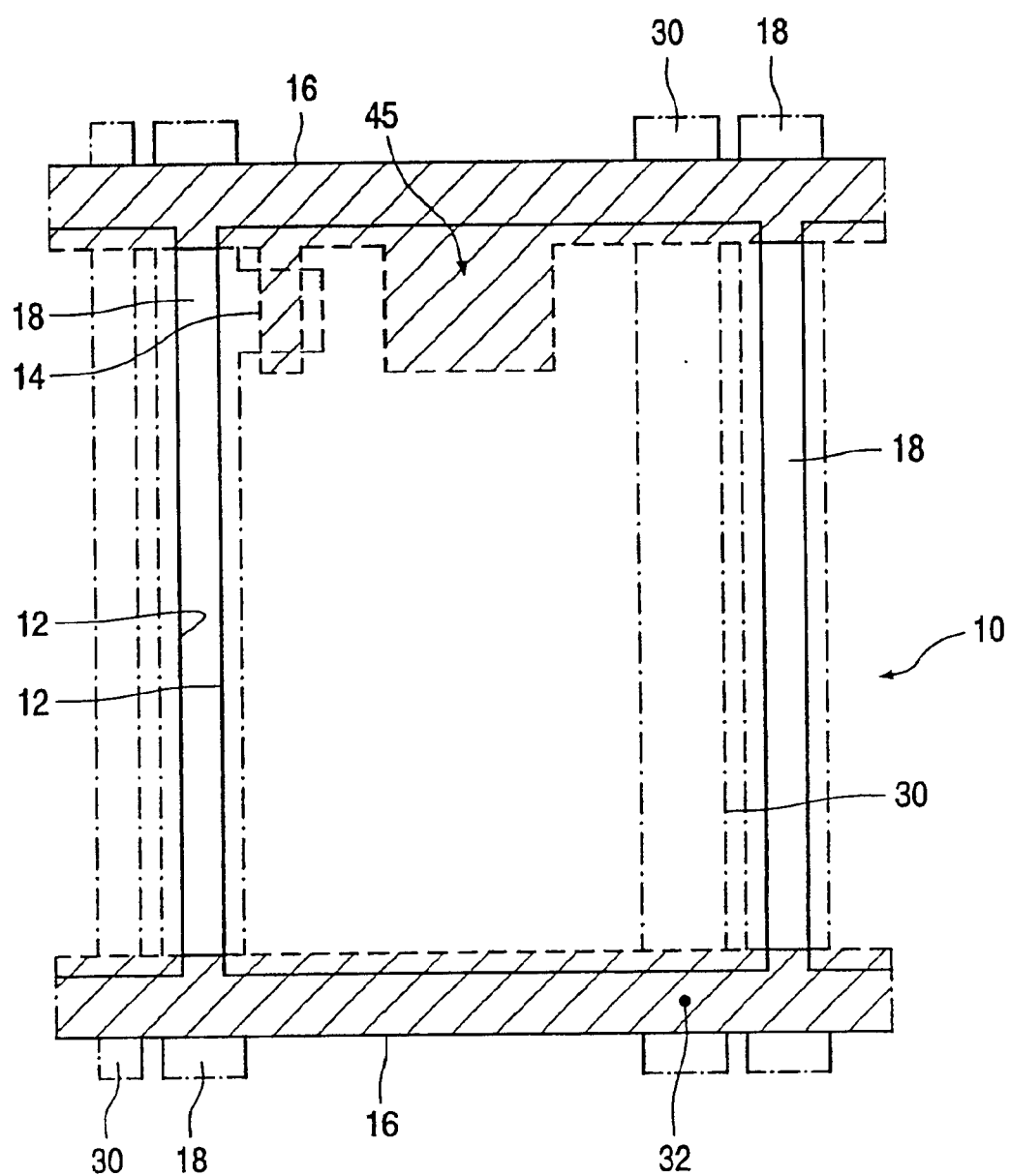
FIG. 6 is a schematic plan view of a typical picture element in the device embodiment of FIG. 4 illustrating the layout of components.

The compensating capacitances 40 may be introduced into the picture elements in various ways. A preferred approach is illustrated in FIG. 6 which shows schematically in plan the structure of a typical picture element in the array having such a capacitance.

The electrode 12 in this example structure is arranged so as to overlap slightly the immediately adjacent row and column address conductors 16 and 18 with an intervening dielectric layer (not shown) being provided. The connection conductor 30 comprises a strip of conductive material crossing beneath the row address conductors 16 and the picture element electrodes 12 in a column and arranged here towards one side of the electrodes 12 parallel with the column conductors and adjacent the column conductor associated with the next column of picture elements. The conductor 30, and likewise the corresponding conductors 30 associated with the other picture element columns, are formed from a deposited layer of conductive material by appropriate photolithographic patterning of that layer and, in this case, the same layer as used to create the column address conductors. Each conductor 30 is formed as a continuous strip extending between opposite sides of the array. At each of the connection points 32, a via is formed in the dielectric layer separating the row address conductor 16 from the underlying conductor 30 prior to the deposition and patterning of the layer forming the row address conductors such that, when formed, they electrically interconnect through the via.

The capacitance 40 is formed by increasing deliberately the extent of overlap between the row conductor 16 and the picture element electrode 12. As shown, this is achieved conveniently by forming the row conductor 16 with an integral extension 45 that projects further beneath the electrode 12. The extension 45 and the immediately overlying portion of the electrode 12 together with the dielectric layer between them constitute a capacitance whose value is easily varied by appropriately adjusting the dimensions, and hence area, of the projection 45 in the fabrication process.

In a transmissive type of display device in which the electrodes 12 comprise transparent conducting material, such as ITO, the conductors 30 are preferably formed of the same material. In a reflective type of display device in which the electrodes are formed of an opaque, reflective, metal, then the conductors 30 may be formed of an opaque metal, such as aluminium.

Although the conductors 30 are shown as extending beneath the column of picture element electrodes 12 in the above example, this need not be the case. The conductors may be arranged at one side of the column of picture element electrodes 12 and alongside a column address conductor 18. This alternative arrangement has the advantage that the aforementioned parasitic capacitance $C_1$ is considerably reduced. However, there is a disadvantage in that the effective picture element size, and hence aperture, is also reduced, in the case of a transmissive display device.

A generally rectangular picture element array is used in the above described example, but it is envisaged that the array may be of a different shape, for example semi-circular. The ability to provide row and column drive circuits, or connection regions therefor, along the same side or opposing sides of the array, allows greater freedom in the choice and implementation of array shapes utilised.

In certain display devices, it may be that the number of columns in the picture element array is greater than the number of rows and so not all the picture element columns have an associated connection conductor 30. In this case, the picture element columns not having an associated connection conductor can each be provided with a similar conductor line which extends along the length of the entire column from one side of the array to the other but which is not connected to a row conductor. The extra lines can be connected to a fixed potential source, e.g. ground. This will ensure that the picture elements in these columns experience a similar capacitive environment to picture elements in columns having a connection conductor.

From reading the present disclosure, other modifications will be apparent to persons skilled in the art. Such modifications may involve other features which are already known in the design, manufacture and use of active matrix displays and component parts therefor and which may be used instead of or in addition to features already described herein.

What is claimed is:

1. An active matrix display device having an array of picture elements which each comprise a picture element electrode and an associated switching device and which are located at respective intersections between crossing first and second sets of address conductors connected to the picture elements and via which selection and data signals respectively are supplied to the picture elements, the device including a set of connection conductors through which selection signals are provided to the first set of address conductors and each of which extends in the direction of, and between, a respective adjacent pair of address conductors of the second set and is electrically connected to a respective address conductor of the first set at the location of a respective picture element, and in which a parasitic capacitance exists in each picture element between the picture element electrode and a connection conductor, wherein picture elements other than those at the locations of the connections between the connection conductors and the address conductors of the first set are each provided with a supplementary capacitance between their picture element electrodes and their associated address conductors of the first set.

2. An active matrix display device according to claim 1, wherein the value of the supplementary capacitance is approximately equal to the value of the parasitic capacitance between the picture element electrode and a connection conductor.

3. An active matrix display device according to claim 1, wherein the supplementary capacitance is provided by a part of the address conductor of the first set overlapping a portion of the picture element electrode.

4. An active matrix display according to claim 3, wherein said part of the address conductor comprises a projection having a predetermined area.

5. An active matrix display device according to any one of claim 1, wherein the connection conductors extend beneath the picture element electrodes.

6. An active matrix display device according to claim 1, wherein the picture elements comprise liquid crystal picture elements.

* * * * *